US009356464B2

(12) United States Patent
Tomiyasu et al.

(10) Patent No.: US 9,356,464 B2
(45) Date of Patent: May 31, 2016

(54) BATTERY PACK AND BATTERY CHARGER THAT CHARGES BASED ON TEMPERATURE

(71) Applicant: MAKITA CORPORATION, Anjo-shi, Aichi (JP)

(72) Inventors: Miki Tomiyasu, Anjo (JP); Tadahiko Kobayakawa, Anjo (JP); Hiroshi Hanai, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 163 days.

(21) Appl. No.: 14/191,744

(22) Filed: Feb. 27, 2014

(65) Prior Publication Data

US 2014/0266071 A1    Sep. 18, 2014

(30) Foreign Application Priority Data

Mar. 13, 2013   (JP) .................................. 2013-050649

(51) Int. Cl.
*H02J 7/04*    (2006.01)
*H02J 7/16*    (2006.01)
*H02J 7/00*    (2006.01)

(52) U.S. Cl.
CPC ....... *H02J 7/0091* (2013.01); *H02J 2007/0049* (2013.01)

(58) Field of Classification Search
CPC .... H02J 7/0091; Y02E 60/12; H01M 10/486; H01M 10/5004; Y02T 10/7005
USPC ....................................................... 320/150
See application file for complete search history.

(56) References Cited

U.S. PATENT DOCUMENTS

| 4,507,368 | A | 3/1985 | Hashimoto | |
|---|---|---|---|---|
| 5,493,199 | A | 2/1996 | Koenck et al. | |
| 6,114,839 | A | 9/2000 | Takano et al. | |
| 6,278,261 | B1 | 8/2001 | Sakakibara | |
| 6,326,767 | B1 * | 12/2001 | Small ................. | H01M 2/1055 320/116 |
| 7,456,605 | B2 * | 11/2008 | Nakasho ............... | H02J 7/0042 320/107 |
| 2005/0099163 | A1 * | 5/2005 | Liepold .................. | G01K 17/06 320/150 |
| 2006/0076926 | A1 | 4/2006 | Lee | |
| 2013/0027828 | A1 | 1/2013 | Noda et al. | |

FOREIGN PATENT DOCUMENTS

| EP | 2 562 894 A1 | 2/2013 |
|---|---|---|
| GB | 2 088 158 A | 6/1982 |
| JP | A-2001-136675 | 5/2001 |

OTHER PUBLICATIONS

Feb. 27, 2015 Extended European Search Report issued in European Application No. 14 15 8293.2.

* cited by examiner

*Primary Examiner* — Arun Williams
(74) *Attorney, Agent, or Firm* — Oliff PLC (57) ABSTRACT

A battery pack includes: a connecting portion connected to a battery charger; a battery chargeable by the battery charger connected to the connecting portion; an environment temperature detecting element detecting an environment temperature around the battery; and a control circuit. The control circuit periodically detects the environment temperature via the environment temperature detecting element and controls the battery charger to suspend starting of charging the battery or to temporarily discontinue charging the battery when a variation of the environment temperature detected exceeds a predetermined range, when the battery charger is connected to the connecting portion.

10 Claims, 9 Drawing Sheets

PARTIALLY ENLARGED B IN FIG. 2B

BATTERY PACK AND BATTERY CHARGER THAT CHARGES BASED ON TEMPERATURE

CROSS-REFERENCE TO RELATED APPLICATIONS

This application claims the benefit of Japanese Patent Application No. 2013-050649 filed on Mar. 13, 2013 in the Japan Patent Office, the disclosure of which is incorporated herein by reference.

BACKGROUND

The present invention relates to a battery pack, which includes a control circuit that controls charging a battery, and a battery charger.

Secondary batteries (batteries), such as nickel-metal-hydride batteries, lithium-ion batteries, etc., have predetermined temperature ranges appropriate for use. If such secondary battery (battery) is used outside the appropriate temperature range, disadvantages may occur, such as lowered charging efficiency, shortened battery life, etc.

Accordingly, some battery chargers for charging these types of batteries are configured to discontinue charging the battery when a detected battery temperature deviates from an appropriate temperature range or rapidly rises while charging.

Other battery chargers are known as being configured to control battery-charging current so that an increase in the battery temperature becomes constant. The battery charger determines that the battery has been fully charged when the increase in the battery temperature is not able to be controlled to be constant any more or when the battery temperature reaches a target temperature, and the battery charger then completes charging (see, for example, Japanese Patent Publication Application No. 2001-136675).

SUMMARY

With the above-described conventional battery chargers, it is possible to charge the battery while maintaining the battery temperature within the appropriate temperature range. Especially, with the battery charger described in the Japanese Patent Publication Application No. 2001-136675, controlling battery-charging current also allows for preventing overcharge of the battery.

However, the above conventional work adopts a technology to control charging by directly detecting a battery temperature by use of a temperature sensor. Therefore, in the event that environment temperatures vary widely between a temperature before the start of charging and a temperature during charging, the charging sometimes is not performed correctly under the influence of such temperature variation.

For instance, when a battery exposed to a low temperature environment is moved to a thermally neutral environment to be charged, the battery is warmed by the thermally neutral environment temperature. Accordingly, when charging, a temperature increase that is not expected to occur during a normal control of charging may occur. This makes the battery charger determine that the battery is abnormal and stop charging the battery.

On the contrary, when a battery exposed to a thermally neutral environment is moved to a low temperature environment to be charged, the battery is cooled down rapidly by the low environment temperature. Accordingly, the battery temperature does not increase even by raising a level of the battery-charging current. This also makes the battery charger determine that the battery is abnormal and stop charging the battery.

It is preferable to provide a battery pack, and a battery charger, that are able to charge a battery in an appropriate manner even when environment temperatures vary between a temperature before the start of charging and a temperature during charging.

A battery pack according to an aspect of the present invention includes a connecting portion to be connected to a battery charger. A battery is charged by the battery charger connected to this connecting portion. The battery pack further includes an environment temperature detecting element that detects an environment temperature around the battery.

A control circuit periodically detects an environment temperature via the environment temperature detecting element and controls the battery charger to suspend starting of charging the battery or to temporarily discontinue charging the battery when a variation of the environment temperature detected exceeds a predetermined range, when the battery charger is connected to the connecting portion.

That is, according to the aspect, it is not the temperature of the battery but the environment temperature around the battery that is detected. When the environment temperature varies widely, the control circuit allows suspending starting of charging the battery. If charging the battery has started already, the charging is temporarily discontinued.

Accordingly, it is possible to inhibit misdetection that the battery is subject to abnormal temperature variation and is operating abnormally. The misdetection may occur due to the variation of the environment temperature around the battery even when the battery operates normally.

With the battery pack according to another aspect of the present invention, the control circuit may control the battery charger to start or re-start charging the battery when the variation of the environment temperature falls within the predetermined range after controlling the battery charger to suspend starting of charging the battery or to temporarily discontinue charging the battery.

Accordingly, it is possible to start or restart charging the battery when the variation of the environment temperature falls within the predetermined range after controlling the battery charger to suspend starting of charging the battery or to temporarily discontinue charging the battery, based upon the variation of the environment temperature around the battery. The charging the battery is completed accordingly.

The environment temperature detecting element serves to detect an environment temperature around the battery. Therefore, the environment temperature detecting element may be arranged on a substrate on which the control circuit is mounted or at a position that is farther away from the battery than the substrate is. Accordingly, it is possible to detect an ambient environment temperature around the battery without being influenced by the variation of the temperature of the battery itself.

With the battery pack according to a further aspect of the present invention, when the control circuit is controlling the battery charger to suspend starting of charging the battery or to temporarily discontinue charging the battery, the control circuit may notify a user via an alarm of the control of the battery charger by the control circuit.

Accordingly, it is possible to notify the user of the elongated operation time to complete charging when the control circuit is controlling the battery charger to suspend starting of charging the battery or to temporarily discontinue charging the battery. According to the battery pack of the present invention, it is thus possible to inhibit providing a sense of discomfort to the user.

The battery pack according to a still further aspect of the present invention further includes a battery temperature detecting element that detects a battery temperature separately from the environment temperature detecting element. The control circuit may periodically detect a battery temperature via the battery temperature detecting element when the battery charger is connected to the connecting portion.

Accordingly, with the above-described battery pack, the control circuit can control charging and discharging the battery by use of the detection results of the environment temperature detected by the environment temperature detecting element and the battery temperature detected by the battery temperature detecting element.

With the above-described battery pack, the control circuit may determine the presence of an abnormality of the environment temperature detecting element when a variation of the battery temperature detected exceeds a predetermined threshold value and the variation of the environment temperature detected falls within the predetermined range. In this case, the control circuit may notify a user of the presence of the abnormality of the environment temperature detecting element via the alarm.

Further, with the above-described battery pack, the control circuit may determine the presence of an abnormality of the battery temperature detecting element when the variation of the environment temperature exceeds the predetermined range and the variation of the battery temperature is equal to or smaller than the predetermined threshold value. In this case, the control circuit may notify a user of the presence of the abnormality of the battery temperature detecting element via the alarm.

Accordingly, with the above-described battery pack, it is possible to detect an abnormality of the environment temperature detecting element or the battery temperature detecting element based upon the variations of the environment temperature and the battery temperature. In addition, it is possible to control the battery charger to stop charging by notifying the battery charger of the abnormality. Therefore, it is possible to enhance reliability of a charging control from the battery charger to the battery pack.

With any of the above-described battery packs, the alarm is not necessarily provided in the battery pack and may be provided in the battery charger. Further, the alarm may be provided both in the battery pack and the battery charger.

When the alarm is provided in the battery charger, the control circuit may control the alarm at the side of the battery charger to notify a user of the condition of the battery pack by transmitting the condition of the battery pack to the battery charger. The condition of the battery pack herein includes: that the control circuit is controlling the battery charger to suspend starting of charging the battery or to temporarily discontinue charging the battery; the presence of the abnormality of the environment temperature detecting element or the battery temperature detecting element, and so on.

Further, the battery charger of an aspect of the present invention is connected to the battery pack of one of the aspect of the present invention and charges the battery. The battery charger includes a charging control unit and the alarm. The charging control unit drives the alarm in accordance with transmitting of the condition of the battery pack from the battery pack and controls the alarm to notify a user of the condition of the battery pack.

Accordingly, with the battery charger according to the aspect of the present invention, it is possible not only to control charging the battery in accordance with the command from the battery pack but also to notify the user of the condition of the battery pack.

BRIEF DESCRIPTION OF THE DRAWINGS

An embodiment of the present invention will be described below with reference to drawings. The present invention should not be construed as limited to the specific means, structures, and so on set forth in the embodiment below and can be achieved in any modes within the scope of the present invention. The Embodiment of the present invention should encompass modes that omit a part of the structures of the embodiments below as long as the mode can solve an object of the present invention. Embodiment of the present invention should further encompass modes formed in appropriate combination of a plurality of embodiments below.

DETAILED DESCRIPTION OF THE PREFERRED EMBODIMENTS

Figure 1:
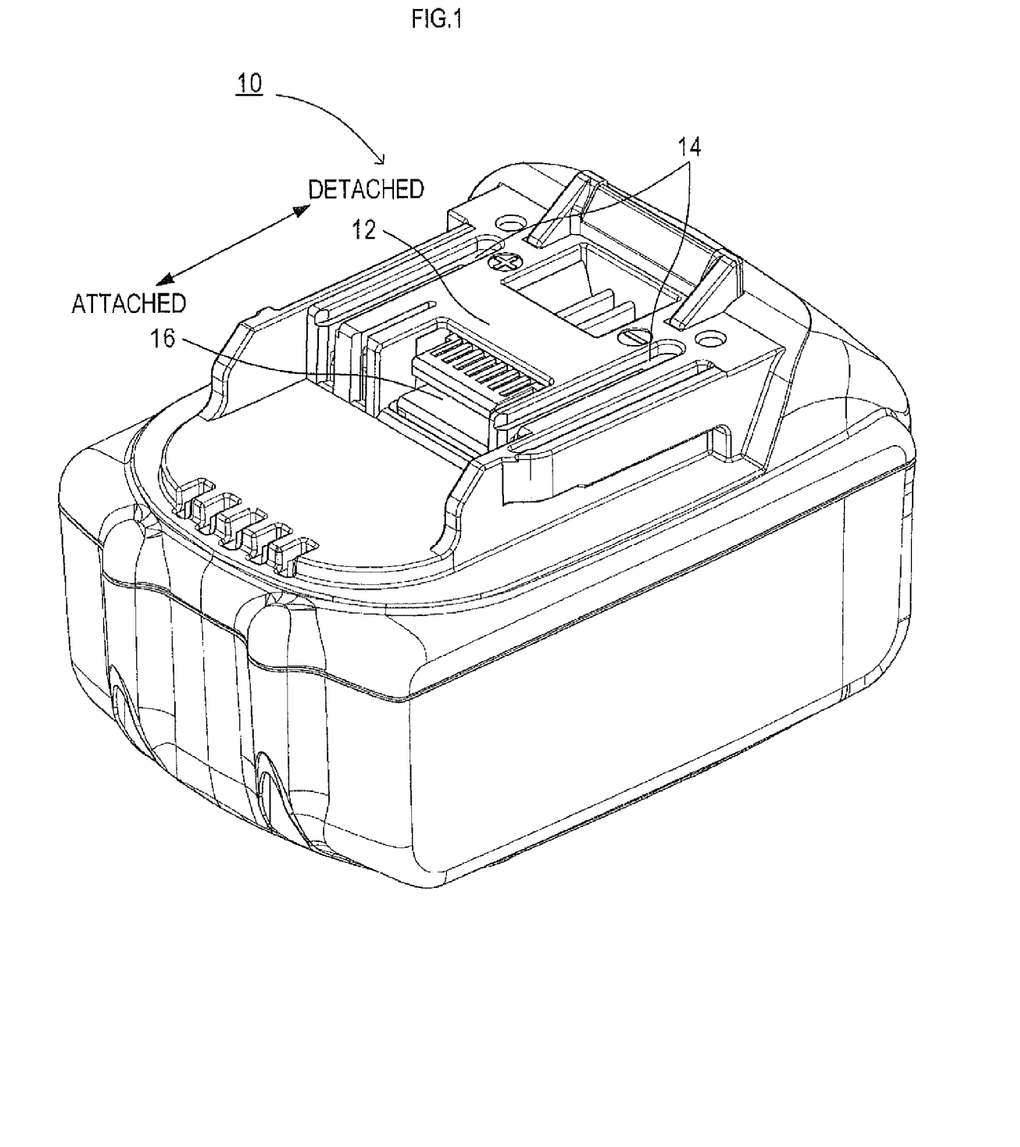
FIG. 1 is a perspective view illustrating an outer appearance of a battery pack of an embodiment of the present invention.

A battery pack 10 according to an embodiment of the present invention serves to supply direct current to an electric power tool. As illustrated in FIG. 1, the battery pack 10 includes an attachment portion 12 to detachably attach the battery pack 10 to the electric power tool or a battery charger. The attachment portion 12 is provided with a power source terminal area 14 and a connecting terminal area 16 to be connected to a battery 20 and a control circuit inside the battery pack 10.

Figure 2A:
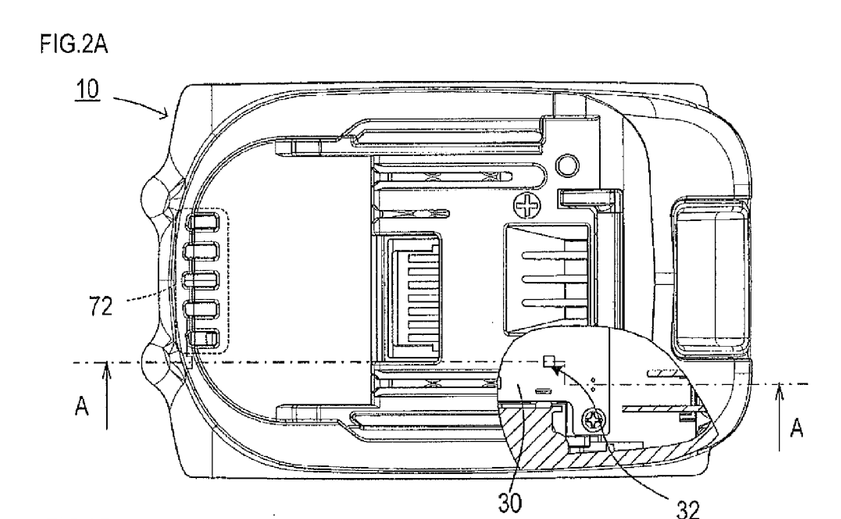
FIG. 2A is a partially broken plan view of the battery pack, illustrating an installed condition of a thermistor inside the battery pack.
Figure 2B:
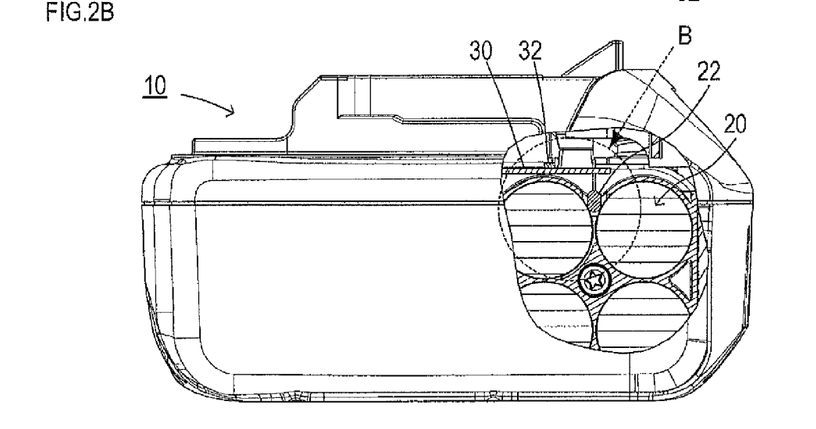
FIG. 2B is a partially broken side view taken along a line A-A shown in FIG. 2A and illustrating the installed condition of the thermistor inside the battery pack.
Figure 2C:
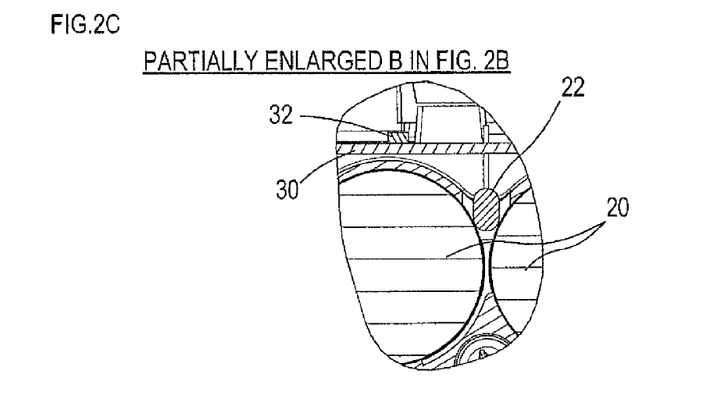
FIG. 2C is an enlarged view of a portion B shown in FIG. 2B and illustrating the installed condition of the thermistor inside the battery pack.

As illustrated in FIGS. 2A, 2B, and 2C, the control circuit of the battery pack 10 is embedded in a control circuit substrate 30 (one example of a substrate) housed in the battery pack 10 along with the battery 20.

The battery 20 is provided with a first thermistor 22 to detect a battery temperature (specifically, among a plurality of cells constituting the battery 20). The battery temperature herein corresponds to a temperature of the battery 20. A second thermistor 32 is mounted at a surface of the control circuit substrate 30 that is on an opposite side to the side of the battery 20, which detects an environment temperature around the battery 20.

Figure 3:
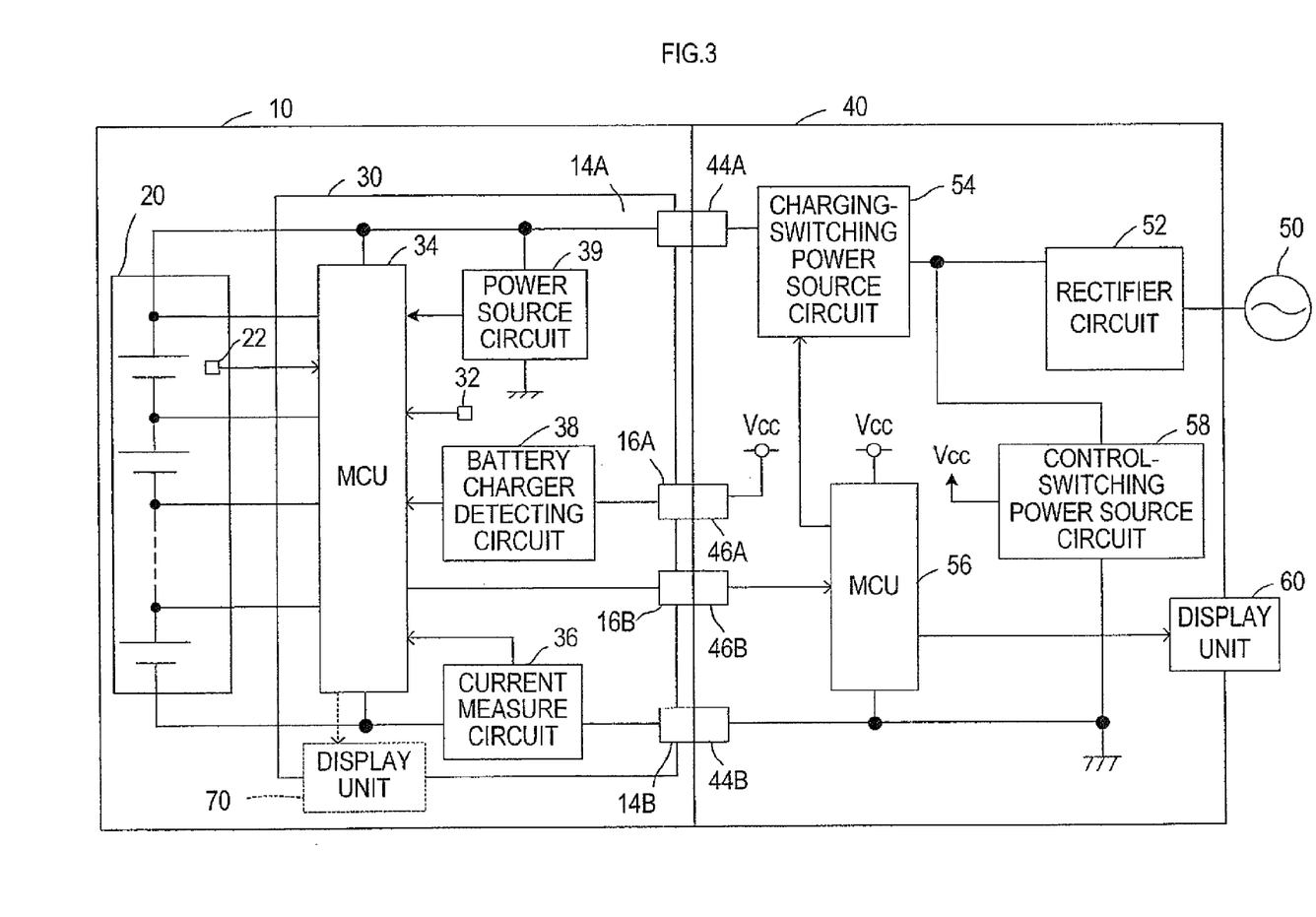
FIG. 3 is a block view illustrating a circuit configuration of the battery pack and a battery charger.

As illustrated in FIG. 3, the battery pack 10 includes a positive electrode terminal 14A and a negative electrode terminal 14B, both provided at the power source terminal area 14, and signal terminals 16A and 16B, both provided at the connecting terminal area 16. The battery pack 10 is electrically connected to a battery charger 40 (see FIG. 3) or an electric power tool (not illustrated) via the terminals 14A, 14B, 16A, and 16B.

The positive electrode terminal 14A is connected to a positive electrode of the battery 20, whereas the negative electrode terminal 14B is connected to a negative electrode of the battery 20. A current measure circuit 36 is provided on a power-source line extending between the negative electrode terminal 14B and the negative electrode of the battery 20, which detects a charging current supplied from the battery charger 40 to the battery 20 and a discharging battery fed from the battery 20 to the electric power tool.

The battery pack 10 further includes a battery charger detecting circuit 38 and a power source circuit 39. The current measure circuit 36, the battery charger detecting circuit 38, and the power source circuit 39 are embedded in the control circuit substrate 30 together with the second thermistor 32 to detect an environment temperature and a microcontroller (MCU) 34 configuring the control circuit of the battery pack 10.

The battery charger detecting circuit 38 detects the connection of the battery pack 10 to the battery charger 40 based upon a power-source voltage Vcc at the battery charger 40 side that is inputted to the signal terminal 16A from the battery charger 40.

The power source circuit 39 is connected in parallel to the battery 20. The power source circuit 39 is power-supplied by the battery 20 or the battery charger 40 and serves to produce a power-source voltage (direct current constant voltage) to drive internal circuits including the MCU 34.

The MCU 34 consists of a microcomputer having a CPU, a ROM, a RAM, and others. The MCU 34 controls charging and discharging the battery 20 based upon a battery voltage, a battery current detected by the current measure circuit 36, a battery temperature detected by the first thermistor 22, an environment temperature detected by the second thermistor 32, or the like.

The battery charger 40 employed to charge the battery 20 includes a positive electrode terminal 44A, a negative electrode terminal 44B, and signal terminals 46A and 46B. The positive electrode terminal 44A, the negative electrode terminal 44B, and the signal terminals 46A and 46B are respectively connected to the positive electrode terminal 14A, the negative electrode terminal 14B, and the signal terminals 16A and 16B when the battery pack 10 is attached to the battery charger 40.

The battery charger 40 further includes a rectifier circuit 52, a charging-switching power source circuit 54, a charging-control MCU 56, a control-switching power source circuit 58, and a display unit 60. The rectifier circuit 52 rectifies alternate current voltage supplied from an alternate current power source such as a commercial power source. An output rectified by the rectifier circuit 52 is sent to the charging-switching power source circuit 54 and the control-switching power source circuit 58.

The charging-switching power source circuit 54 is a switching circuit that charges the battery 20 based upon the output of the rectifier circuit 52 and is driven by the MCU 56.

Like the MCU 34 of the battery pack 10, the MCU 56 consists of a microcomputer. The MCU 56 receives a condition of the battery 20 from the MCU 34 of the battery pack 10 via the signal terminals 16B and 46B and controls driving the charging-switching power source circuit 54. In this manner, the MCU 56 controls charging current, charging voltage, and so on for the battery 20.

The control-switching power source circuit 58 produces a power-source voltage Vcc to drive internal circuits such as the MCU 56. A ground of the battery charger 40 is connected to the negative electrode of the battery 20 via the negative electrode terminals 44B, 14B, and the current measure circuit 36. A charging voltage generated by the charging-switching power source circuit 54 is applied to the positive electrode of the battery 20 via the positive electrode terminals 44A and 14A.

The signal terminal 46B of the battery charger 40 is applied with the power-source voltage Vcc generated by the control-switching power source circuit 58. Therefore, when the battery pack 10 is attached to the battery charger 40 and the power-source voltage Vcc is generated by the control-switching power source circuit 58, the battery charger detecting circuit 38 detects the attachment of the battery pack 10 to the battery charger 40. The detection by the battery charger detecting circuit 38 is outputted to the MCU 34.

The display unit 60 is provided in the battery charger 40 and is employed to indicate the charging state of the battery 20, and/or abnormalities of respective portions of the battery pack 10.

Described below are control processes respectively performed by the MCU 34 of the battery pack 10 and by the MCU 56 of the battery charger 40 prior to the start of charging the battery 20 and while charging the battery 20.

[Control Before Start of Charging]

The MCU 34 of the battery pack 10 operates in sleep mode, i.e., low-power consumption mode, when the battery pack 10 is not attached to the battery charger 40 or the electric power tool. Once the battery pack 10 is attached to the battery charger 40 or the electric power tool, the MCU 34 of the battery pack 10 shifts to a normal operating mode in which the MCU 34 monitors the condition of the battery 20 to protect the battery 20. Many microcomputers nowadays show relatively low power consumption. Therefore, by configuring the MCU 34 with a microcomputer having a low power consumption, the MCU 34 may operate in the normal operating mode all the time without any sleep mode interruption.

Figure 4:
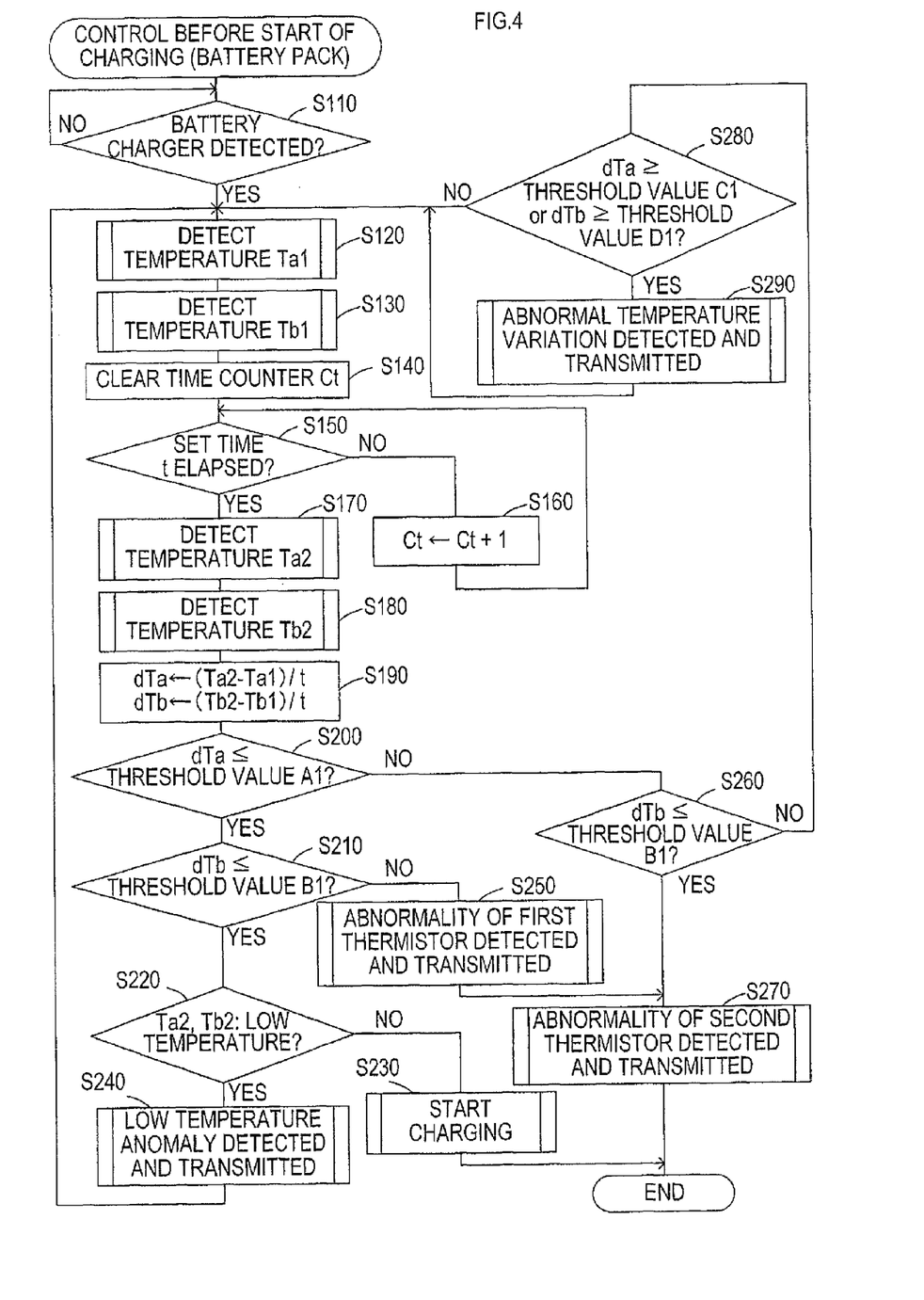
FIG. 4 is a flowchart illustrating a control before start of charging performed by the battery pack.

Accordingly, as illustrated in FIG. 4, before the start of charging the battery 20, the MCU 34 periodically determines in S110 (hereinafter S denotes Step) whether the battery charger 40 has been detected. Therefore, the MCU 34 does not perform the processes indicated in S120 and after until the MCU 34 determines the detection of the battery charger 40 after the battery pack 10 is attached to the battery charger 40.

In sleep mode, the MCU 34 determines whether the battery pack 10 has been attached to the electric power tool. When the MCU 34 determines the attachment to the electric power tool, the MCU 34 communicates with a control circuit (MCU) of the electric power tool and performs a discharge control to drive the electric power tool. The discharge control is not an essential part of the present invention, so that the explanation will be omitted.

As illustrated in FIG. 4, the MCU 34 detects in S120 a battery temperature Ta1 by use of the first thermistor 22. In the next step S130, the MCU 34 detects an environment temperature Tb1 by use of the second thermistor 32.

In S140, the MCU 34 clears a time counter Ct. In S150, the MCU 34 determines based upon a value of the time counter Ct whether a predetermined set time t has elapsed from the detections of the battery and environment temperatures in S120 and S130.

When the MCU 34 determines in S150 that the set time t has not yet elapsed, the process proceeds to S160, wherein the MCU 34 increments (+1) the time counter Ct, and hence counts (i.e., times) an elapsed time from the detections of the battery and environment temperatures in S120 and S130 in accordance with a clocking operation of the MCU 34. The process then returns to S150.

In other words, in S160, the MCU 34 times the elapsed time from the detections of the battery and environment temperatures at S120 and S130 by repetitively incrementing the time counter Ct. In S150, the MCU 34 determines whether the elapsed time has reached the predetermined set time t.

When the MCU 34 determines in S150 that the predetermined set time t has elapsed, the process proceeds to S170. In S170, the MCU 34 detects by use of the first thermistor 22 a battery temperature Ta2 after the lapse of the set time t. In S180, the MCU 34 detects by use of the second thermistor 32 an environment temperature Tb2 after the lapse of the set time t.

In S190, the MCU 34 calculates temperature variations dTa and dTb per unit of time during the lapse of the set time t (i.e., differential values dTa and dTb), in accordance with the formulas as described below. The temperature variation dTa as used herein is a temperature variation of the battery temperatures Ta and the temperature variation dTb as used herein is a temperature variation of the environment temperatures Tb.

$$dTa=(Ta2-Ta1)/t$$

$$dTb=(Tb2-Tb1)/t$$

In S200, the MCU 34 determines whether the temperature variation dTa of the battery temperature Ta (specifically, its absolute value) is a predetermined threshold value A1 or less. When the absolute value of the temperature variation dTa is greater than the threshold value A1 in S200, the process proceeds to S260. Meanwhile, when the absolute value of the temperature variation dTa is the threshold value A1 or less in S200, the process proceeds to S210.

In S210, the MCU 34 determines whether the temperature variation dTb of the environment temperature Tb (specifically, its absolute value) is a predetermined threshold value B1 or less. When the absolute value of the temperature variation dTb is determined to be greater than the threshold value B1 in S210, the process proceeds to S250. Meanwhile, when the absolute value of the temperature variation dTb is determined to be the threshold value B1 or less in S210, the process proceeds to S220.

In S220, the MCU 34 determines whether at least either the current battery temperature Ta2 detected in S170 or the current environment temperature Tb2 detected in S180 is a low temperature equal to or smaller than a predetermined temperature. When the MCU 34 determines in S220 that neither the battery temperature Ta2 nor the environment temperature Tb2 are the low temperature (not low-temperature anomaly), the MCU 34 determines that a condition of charging the battery 20 has been satisfied, and the process proceeds to S230.

In S230, the MCU 34 starts charging the battery 20 by outputting to the battery charger 40 a command to start charging (hereinafter referred to as charging-start command) and completes the control before the start of charging.

Meanwhile, when the MCU 34 determines in S220 that either the battery temperature Ta2 or the environment temperature Tb2 or both of them are the low temperature (low-temperature anomaly), the process proceeds to S240. In S240, the MCU 34 detects the low-temperature anomaly of the battery 20 and transmits the anomaly of the battery 20 to the MCU 56 of the battery charger 40.

After transmitting the low-temperature anomaly to the MCU 56 of the battery charger 40 in S240, the process returns to S120. The MCU 34 performs again a series of the above-described processes and waits until the condition of charging the battery 20 is satisfied.

When the absolute value of the temperature variation dTb of the environment temperature Tb is determined to be greater than the threshold value B1 in S210, i.e., when the variation of the temperature (battery temperature) detected by the first thermistor 22 is small despite the wide variation of the temperature (environment temperature) detected by the second thermistor 32, the process proceeds to S250.

In S250, the MCU 34 determines that the first thermistor 22 can not detect a battery temperature normally. In this case, the abnormality of the first thermistor 22 is transmitted to the MCU 56 of the battery charger 40, and the control before the start of charging is completed.

When the absolute value of the temperature variation dTa of the battery temperature Ta is determined in S200 to be greater than the threshold value A1, the process proceeds to S260. In S260, the MCU 34 determines whether the absolute value of the temperature variation dTb of the environment temperature Tb is the predetermined threshold value B1 or less.

When the absolute value of the temperature variation dTb of the environment temperature Tb is determined in S260 to be the threshold value B1 or less, i.e., when the variation of the temperature (environment temperature) detected by the second thermistor 32 is small, despite the wide variation of the temperature (battery temperature) detected by the first thermistor 22, the program proceeds to S270.

At S270, the MCU 34 determines that the second thermistor 32 can not detect an environment temperature normally. In this case, the abnormality of the second thermistor 32 is transmitted to the MCU 56 of the battery charger 40, and the control before the start of charging is completed.

When the absolute value of the temperature variation dTb of the environment temperature Tb is determined in S260 to be greater than the threshold value B1, i.e., when the battery temperature and the environment temperature both widely vary, the first thermistor 22 and the second thermistor 32 are determined to operate normally. The process then proceeds to S120. The MCU then performs again the series of the above-described processes and waits until the condition of charging the battery 20 is satisfied.

In addition, when the process returns from S260 to S120, the process goes through S280 at which the MCU 34 determines 1) whether the temperature variation dTa of the battery temperatures Ta (specifically, its absolute value) is equal to or greater than a threshold value C1, C1 being greater than the threshold value A1 or 2) whether the temperature variation dTb of the environment temperatures Tb (specifically, its absolute value) is equal to or greater than a threshold value D1, D1 being greater than the threshold value B1.

When either 1) or 2) is satisfied in S280, i.e., when the absolute value of the temperature variation dTa of the battery temperatures Ta is equal to or greater than the threshold value C1 or when the absolute value of the temperature variation dTb of the environment temperatures Tb is equal to or greater than the threshold value D1, the process proceeds to S290. When neither 1) nor 2) are satisfied in S280, the process returns to S120 directly.

In S290, the variation of either the battery temperature Ta or the environment temperature Tb is equal to or greater than the threshold value C1 or D1. In this case, the MCU 34 determines that abnormal temperature variation has occurred. The abnormality is transmitted to the MCU 56 of the battery charger 40 and the process returns to S120.

As described above, during the control before the start of charging performed by the MCU 34 of the battery pack 10, an abnormality of the thermistor 22 or 32 is detected based upon the difference between the variation of the battery temperature detected by the first thermistor 22 and the variation of the environment temperature detected by the second thermistor 32, and the abnormality of the thermistor 22 or 32 is transmitted to the battery charger 40 (S250, S270).

When the variations of the battery temperature and the environment temperature are both small, the MCU 34 first determines that each temperature is not the low temperature and then allows the battery charger 40 to start charging the battery 20 (S230). When at least either the battery temperature or the environment temperature is the low temperature, the low-temperature anomaly is transmitted to the battery charger 40 (S240). The MCU 34 thus suspends the starting of charging the battery 20 until each temperature returns to a normal temperature.

When the variations of the battery temperature and the environment temperature are both large, the MCU 34 also suspends the starting of charging the battery 20. When the variations of the battery temperature and the environment temperature are abnormally large (in case of equal to or greater than the thresholds C1 and D1), the abnormalities are transmitted to the battery charger 40 (S290).

Figure 6A:
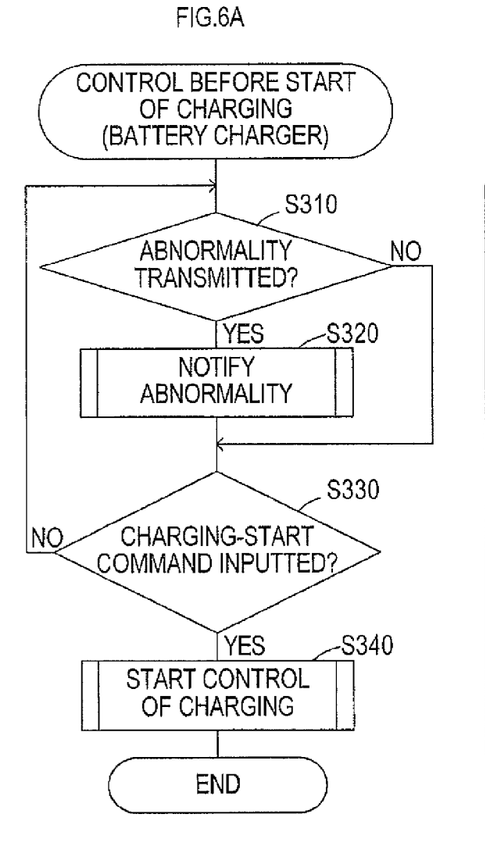
FIG. 6A is a flowchart illustrating a charging-control process performed by the battery charger, and it is specifically a flowchart illustrating a control before start of charging.

Through a control before the start of charging performed by the MCU 56 of the battery charger 40, as illustrated in FIG. 6A, the MCU 56 determines in S310 the presence or absence of the abnormality transmission of the abnormality of the thermistor 22 or 32, the low-temperature anomaly, or the abnormal temperature variation(s).

When the MCU 56 determines the presence of the abnormality transmission in S310, the MCU 56 notifies the user of the abnormality by so indicating on the display unit 60 (S320). The process then proceeds to S330. When the MCU 56 determines in S310, to the contrary, the absence of the abnormality transmission, the process proceeds to S330 directly.

The MCU 56 determines in S330 whether the charging-start command has been inputted by the MCU 34 of the battery pack 10. When there is no input in S330, the process returns to S310 and the MCU 56 waits for inputting of the charging-start command. When there is the input in S330, the process proceeds to S340, at which the control of charging the battery 20 is started and then the control before the start of charging is completed.

Accordingly, according to the battery pack 10 of the embodiment, charging by the battery charger 40 is suspended until the battery temperature and the environment temperature become stable, based upon the variations of the battery temperature and the environment temperature that may be caused due to ambient environment changes, before the start of charging the battery 20.

Further, with reference to the temperature variations detected, it is possible to detect abnormalities, such as the abnormality of the thermistor 22 or 32, the low-temperature anomaly, and the abnormal temperature variation(s), etc., and to notify the user of the detecting result via the battery charger 40.

[Control During Charging]

Figure 5:
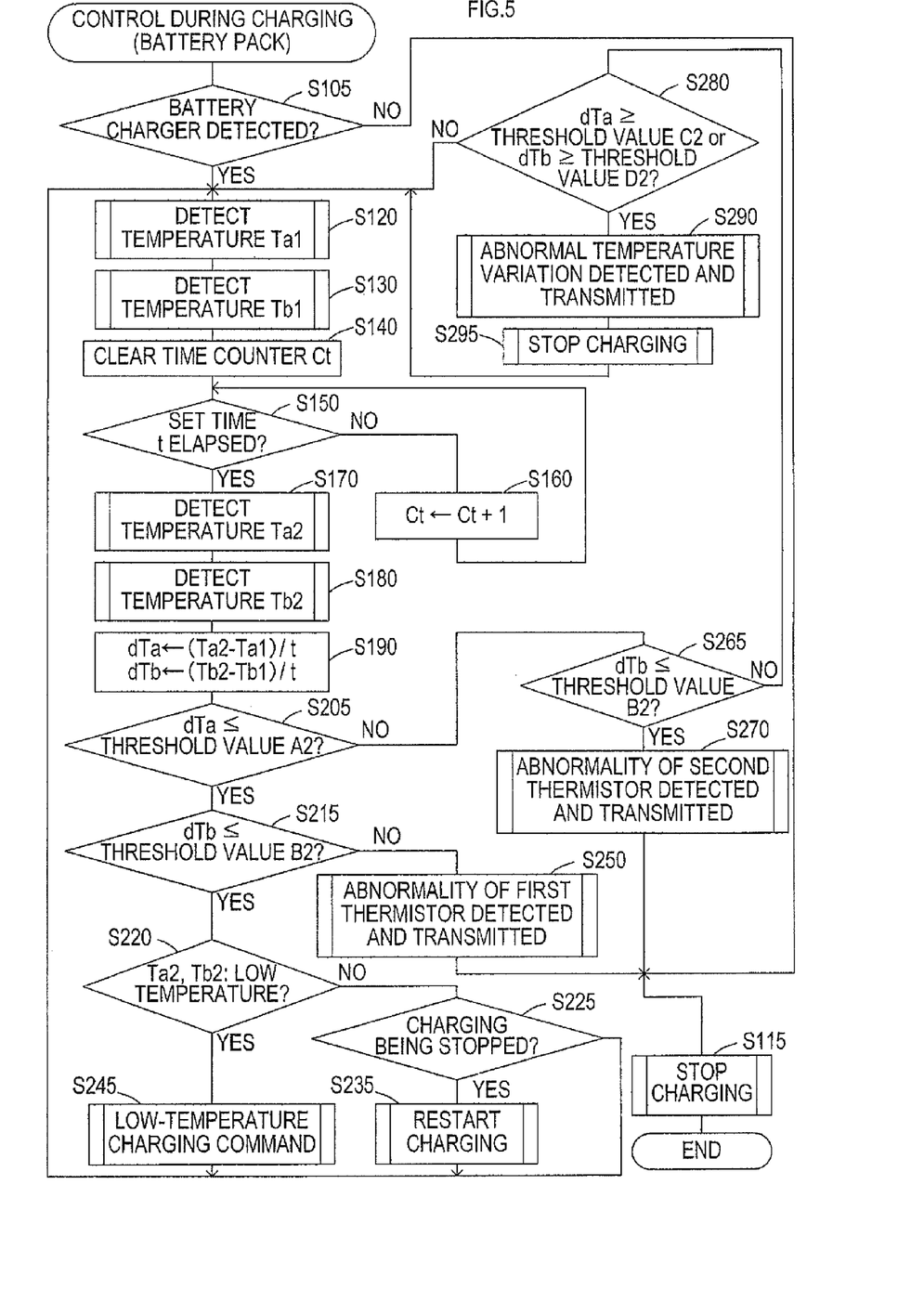
FIG. 5 is a flowchart illustrating a control during charging performed by the battery pack.

As illustrated in FIG. 5, at a control during charging performed by the MCU 34 of the battery pack 10 while charging the battery 20, the MCU 34 first determines in S105 whether the battery charger detecting circuit 38 detects a connection of the battery pack 10 to the battery charger 40.

When the connection to the battery charger 40 is not detected, i.e., when the battery pack 10 is detached from the battery charger 40, the MCU 34 discontinues charging the battery 20 in S115, and the control during charging is terminated. The termination of this control allows the MCU 34 to enter sleep mode.

When the connection to the battery charger 40 is detected in S105, a series of S120 to S190 is performed, similar to the control before starting charging as illustrated in FIG. 4. In S205, the MCU 34 determines whether the absolute value of the temperature variation dTa of the battery temperature Ta is a predetermined threshold value A2 or less.

When the absolute value of the temperature variation dTa of the battery temperature Ta is determined in S205 to be the threshold value A2 or less, the process proceeds to S215. In S215, the MCU 34 determines whether the absolute value of the temperature variation dTb of the environment temperature Tb is a predetermined threshold value B2 or less.

When the absolute value of the temperature variation dTb of the environment temperature Tb is greater than the threshold value B2, the process proceeds to S250, similar to the control before starting charging. In S250, the MCU 34 determines that the first thermistor 22 cannot detect a battery temperature normally. In this case, the abnormality of the first thermistor 22 is transmitted to the MCU 56 of the battery charger 40.

After the abnormality transmission in S250, the process proceeds to S115, in which the MCU 34 of the battery pack 10 outputs to the MCU 56 of the battery charger 40 a command to stop charging the battery 20 (hereinafter referred to as charging-stop command), and the control during charging is completed.

When the absolute value of the temperature variation dTb of the environment temperature Tb is determined in S215 to be the threshold value B2 or less, the process proceeds to S220, similar to the control before starting charging. In S220, the MCU 34 of the battery pack 10 determines whether at least one of the current battery temperature Ta2 detected in S170 and the current environment temperature Tb2 detected in S180 is a low temperature of a predetermined temperature or smaller.

When the MCU 34 determines in S220 that either the battery temperature Ta2 or the environment temperature Tb2 or both of them are the low temperature (low-temperature anomaly), the process proceeds to S245. In S245, the MCU 34 of the battery pack 10 outputs a low-temperature charging command to the battery charger 40 and then switches the control of charging the battery 20 to a charging control appropriate to a low-temperature environment. The process then returns to S120.

When the MCU 34 of the battery pack 10 determines in S220 that neither the battery temperature Ta2 nor the environment temperature Tb2 are the low temperature (not low-temperature anomaly), the process proceeds to S225. In S225, the MCU 34 of the battery pack 10 determines whether the battery charger 40 is currently discontinuing a charging control performed at normal times (hereinafter, referred to as normal charging control). In addition, in S225, the MCU 34 of the battery pack 10 determines whether the MCU 34 is currently controlling the battery charger 40 to perform the charging control under a low-temperature environment after transmitting the low-temperature charging command to the battery charger 40 in S245, or whether the MCU 34 is currently controlling the battery charger 40 to temporarily discontinue charging the battery 20 due to the detection of the abnormal temperature variation in S295 described below.

When the MCU 34 determines in S225 that the MCU 34 is currently controlling the battery charger 40 to discontinue the normal charging control, the process proceeds to S235. In S235, the MCU 34 outputs a charging-restart command to the battery charger 40 in order to control the battery charger 40 to restart the normal charging control. The process then returns to S120.

When the absolute value of the temperature variation dTa of the battery temperature Ta is determined to be greater than the threshold value A2 in S205, the process proceeds to S265. In S265, the MCU 34 determines whether the absolute value of the temperature variation dTb of the environment temperature Tb is the predetermined threshold value B2 or less.

When the absolute value of the temperature variation dTb of the environment temperature Tb is determined in S265 to be the threshold value B2 or less, the process proceeds to S270, similar to the control before starting charging. In S270, the MCU 34 determines that the first thermistor 22 can not detect a battery temperature normally. In this case, the abnormality of the first thermistor 22 is transmitted to the MCU 56 of the battery charger 40.

After the abnormality transmission in S270, the process proceeds to S115, in which the MCU 34 of the batter pack 10 outputs to the MCU 56 of the battery charger 40 the charging-stop command so as to complete the control during charging.

When the absolute value of the temperature variation dTb of the environment temperature Tb is determined in S265 to be greater than the threshold value 132, the process proceeds to S285. In S285, the MCU 34 determines 1) whether the absolute value of the temperature variation dTa of the battery temperature Ta is equal to or greater than a threshold value C2, C2 being greater than the threshold value A2 or 2) whether the absolute value of the temperature variation dTb of the environment temperature Tb is equal to or greater than a threshold value D2, D2 being greater than the threshold value B2.

When the absolute value of the temperature variation dTa of the battery temperature Ta and the absolute value of the temperature variation dTb of the environment temperature Tb are respectively determined to be smaller than the threshold values C2 and D2 in S285, the process returns to S120. When either 1) or 2) is satisfied in S285, i.e., when the absolute value of the temperature variation dTa of the battery temperature Ta is equal to or greater than the threshold value C2 or when the absolute value of the temperature variation dTb of the environment temperature Tb is equal to or greater than the threshold value D2, the process proceeds to S290, similar to the control before the start of charging. At S290, the MCU 34 of the battery pack 10 detects the presence of the abnormal temperature variation and transmits the detection result of the abnormality to the MCU 56 of the battery charger 40.

After transmitting the abnormal temperature variation to the battery charger 40 in S290, the process proceeds to S295. In S295, the MCU 34 of the battery pack 10 transmits to the battery charger 40 a command to temporarily discontinue charging the battery 20 (hereinafter referred to as charging-temporarily discontinue command), and then the process returns to S120.

As described above, while the control during charging performed by the MCU 34 of the battery pack 10, similar to the control before the start of charging, abnormality of the thermistor 22 or 32 is detected based upon the difference between the variation of the battery temperature detected by the first thermistor 22 and the variation of the environment temperature detected by the second thermistor 32, and the abnormality is transmitted to the battery charger 40 (S250, S270).

After detecting the abnormality of the thermistor 22 or 32, the MCU 34 of the battery pack 10 outputs to the MCU 56 of the battery charger 40 the charging-discontinue command so as to discontinue charging the battery 20 (S115).

When the variations of the battery temperature and the environment temperature are both small, similar to the control before the start of charging, the MCU 34 determines whether each temperature is the low temperature (S220). When at least either the battery temperature or the environment temperature is the low temperature, the process proceeds to S245, in which the MCU 34 controls the battery charger 40 to perform the charging control appropriate to the low-temperature environment.

When the MCU 34 determines in S220 that neither the battery temperature nor the environment temperature are the low temperature, the MCU 34 of the battery pack 10 allows the battery charger 40 to continue or restart the normal charging control (S225, S235).

When the variations of the battery temperature and the environment temperature are both large, the MCU 34 of the battery pack 10 transmits the large variations to the battery charger 40 and controls the battery charger 40 to temporarily discontinue charging the battery 20 (S290, S295).

Figure 6B:
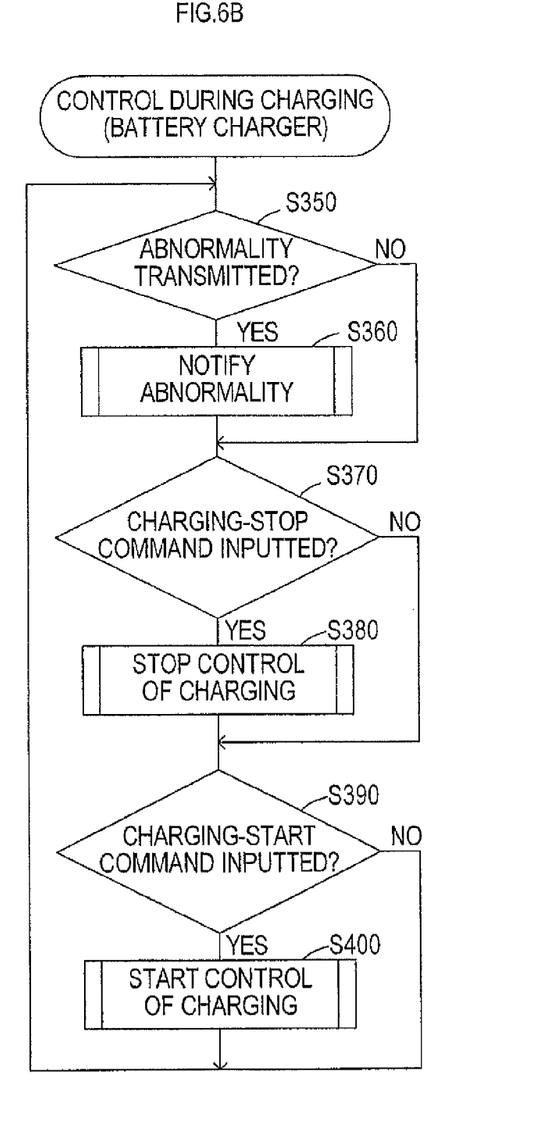
FIG. 6B is a flowchart illustrating the charging-control process performed by the battery charger, and it is specifically a flowchart illustrating a control during charging.

Through the control during charging performed by the MCU 56 of the battery charger 40, as illustrated in FIG. 6B, the MCU 56 determines in S350 the presence or absence of the abnormality transmission of the abnormality of the thermistor 22 or 32, the low-temperature anomaly, or the abnormal temperature variation.

When the MCU 56 determines in S350 the presence of the abnormality transmission, the process proceeds to S360 in which the MCU 56 notifies the user of the abnormality by so indicating on the display unit 60. The process then proceeds to S370. When the MCU 56 determines in S350, to the contrary, the absence of the abnormality transmission, the process proceeds to S370 directly.

In S370, the MCU 56 of the battery charger 40 determines whether the charging-stop command has been inputted from the MCU 34 of the battery pack 10. When the MCU 56 determines in S370 the input of the charging-stop command, the process proceeds to S380 in which the MCU 56 discontinues the control of charging the battery 20 currently being performed. The process then proceeds to S390. When the MCU 56 does not determine in S370 the input of the charging-stop command from the MCU 34 of the battery pack 10, the process proceeds to S390 directly.

In S390, the MCU 56 of the battery charger 40 determines whether a command to start charging (specifically, charging-restart command or low-temperature charging command) has been inputted from the MCU 34 of the battery pack 10.

When the MCU 56 determines in S390 the presence of the charging-start command, the MCU 56 starts in S400 the charging control that corresponds to the charging-start command. The process then returns to S350. When the MCU 56 does not determine in S390 the presence of the charging-start command, the process returns to S350 directly.

As described above, while charging the battery 20 by the battery charger 40, the battery pack 10 of the embodiment can detect variations of the battery temperature and the environment temperature, which are caused due to ambient environment changes, and can temporarily stop charging the battery 20 by the battery charger 40.

After controlling the battery charger 40 to temporarily discontinue charging the battery 20, it is possible to restart charging the battery 20 by the battery charger 40 when the battery temperature and the environment temperature become stable.

Further, with reference to the temperature variations detected, it is possible to detect abnormalities, such as the abnormality of the thermistor 22 or 32, the low-temperature anomaly, and the abnormal temperature changes, and to notify the user of the detecting result of the abnormality via the battery charger 40.

According to the embodiment, the positive electrode terminal 14A, the negative electrode terminal 14B, and the signal terminals 16A and 16B of the battery pack 10 correspond to an example of a connecting portion of the present invention. The second thermistor 32 corresponds to an example of an environment temperature detecting element of the present invention. The first thermistor 22 corresponds to an example of a battery temperature detecting element of the present invention. The MCU 34 corresponds to an example of a control circuit of the present invention.

The display unit 60 of the battery charger 40 corresponds to an example of an alarm of the present invention. The MCU 55 corresponds to an example of a charging control unit of the present invention.

Modified Example

The embodiment of the present invention has been described above. However, the embodiment described above should not be considered restrictive in any way, and the embodiment may be modified in many ways within the scope of the present invention.

For example, according to the embodiment as described above, the battery pack 10 is provided with the first thermistor 22 that detects a battery temperature in addition to the second thermistor 32 that detects an environment temperature around the battery 20.

However, the present invention may be achieved by a battery pack provided with only the second thermistor 32 that detects an environment temperature around the battery 20. In this case, it is not possible to detect the abnormality of the first thermistor 22 or the second thermistor 32 with reference to variations of a battery temperature detected by the first thermistor 22 and an environment temperature detected by the second thermistor 32, as described in the above embodiment.

However, the MCU 34 of the battery pack 10 can detect rapid changes in environment temperatures before the start of charging the battery 20, with reference to a variation in environment temperatures detected by the second thermistor 32. Accordingly, the MCU 34 can temporarily suspend starting charging the battery 20. Once the temperature variation becomes stable later, the MCU 34 can start charging the battery 20.

Further, the MCU 34 of the battery pack 10 can detect rapid changes in ambient temperatures while charging the battery 20. Accordingly, the MCU 34 can temporarily stop charging the battery 20. Once the ambient temperature becomes stable later, the MCU 34 can restart charging the battery 20.

Hereinafter, a control before the start of charging and a control during charging are described, both of which are performed by the MCU 34 of the battery pack 10 when a control of charging the battery 20 is performed only based upon environment temperatures around the battery 20 detected by the second thermistor 32.

Figure 7:
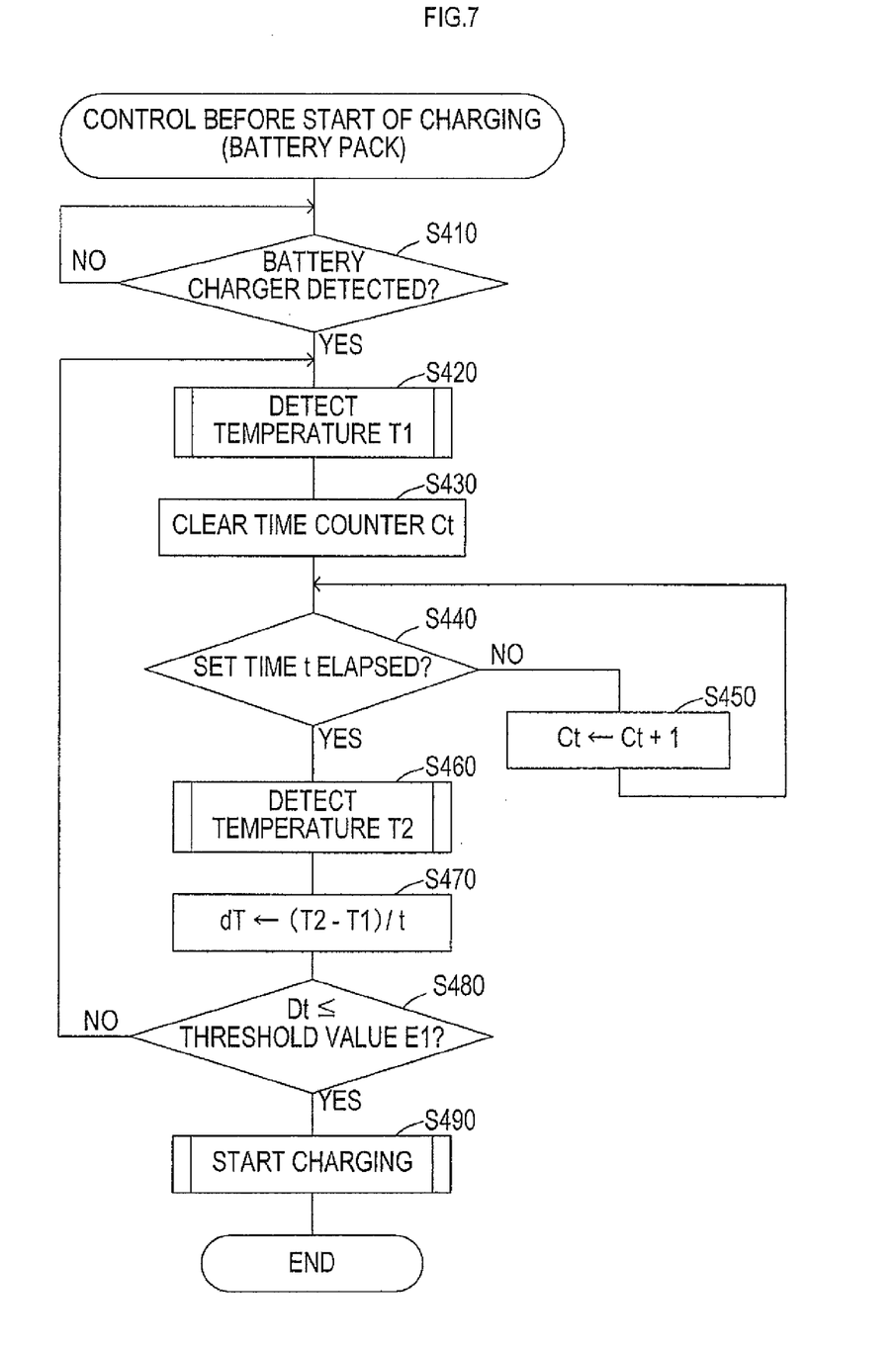
FIG. 7 is a flowchart illustrating a control before start of charging performed by a battery pack according to a modified example.

As illustrated in FIG. 7, to initiate the control before the start of charging, the MCU 34 of the battery pack 10 periodically determines in S410 whether the battery charger 40 has been detected, i.e., whether the battery pack 10 has been attached to the battery charger 40. In this case, the control before start of charging is not performed until the battery pack 10 is attached to the battery charger 40.

When the MCU 34 of the battery pack 10 determines in S410 the detection of the battery charger 40, the process proceeds to S420. In S420, the MCU 34 detects an environment temperature T1 by use of the second thermistor 32. In S430, the MCU 34 clears the time counter Ct.

In S440, the MCU 34 determines with reference to the value of the time counter Ct whether a predetermined set time t has elapsed after detecting the environment temperature T1 in S420. When the MCU 34 determines in S440 that the set time t has not yet elapsed, the process proceeds to S450. In S450, the MCU 34 increments (+1) the time counter Ct, and hence counts, i.e., times an elapsed time from the detection of the environment temperature T1 in S420. The process then returns to S440.

When the MCU 34 determines in S440, to the contrary, that the set time t has elapsed after detecting the environment temperature T1 in S420, the process proceeds to S460. In S460, the MCU 34 detects an environment temperature T2 after the lapse of the set time t.

In S470, the MCU 34 calculates a temperature variation dT of the environment temperatures T that have varied during the set time t in accordance with the formula: $dT=(T2-T1)/t$. In S480, the MCU 34 determines whether the absolute value of the temperature variation dT is a predetermined threshold value E1 or less.

When the MCU 34 determines in S480 that the absolute value of the temperature variation dT is greater than the threshold value E1, i.e., when the environment temperatures T vary widely, the process returns to S420. The MCU 34 performs again a series of the above-described processes and waits until the environment temperature T becomes stable.

When the MCU 34 determines in S480 that the absolute value of the temperature variation dT is the threshold value E1 or less, it is considered that a condition to charge the battery 20 has been satisfied. The process then proceeds to S490. In S490, the MCU 34 starts charging the battery 20 by outputting the charging-start command to the battery charger 40 so as to complete the control before the start of charging.

Figure 8:
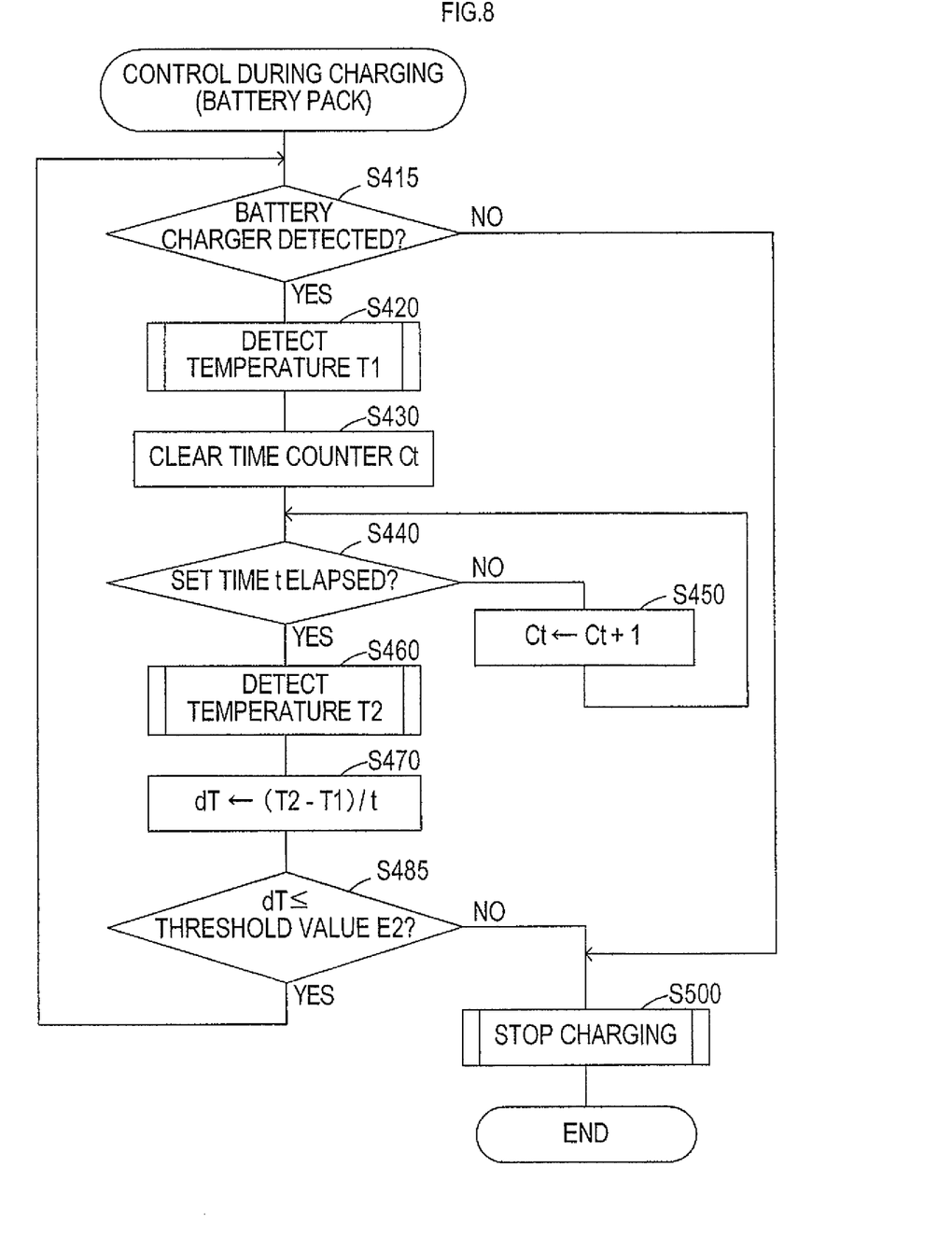
FIG. 8 is a flowchart illustrating a control during charging performed by the battery pack according to the modified example.

As illustrated in FIG. 8, at the control during charging, the MCU 34 first determines in S415 whether the battery charger detecting circuit 38 detects a connection of the battery pack 10 to the battery charger 40. When the MCU 34 does not determine in S415 the detection of the battery charger 40, the process proceeds to S500 to stop charging the battery 20 so as to complete the control during charging.

When the MCU 34 determines in S415 the detection of the battery charger 40, similar to the control before start of charging illustrated in FIG. 7, the MCU 34 performs a series of S420 to S470. In S485 following S470, the MCU 34 determines whether the absolute value of the temperature variation dT is a predetermined threshold value E2 or less.

When the MCU 34 determines in S485 that the absolute value of the temperature variation dT is the threshold value E2 or less, the process returns to S415. The MCU 34 then performs again a series of the above-described processes and allows the battery charger 40 to continue charging the battery 20.

When the MCU 34 determines in S485, to the contrary, that the absolute value of the temperature variation dT is greater than the threshold value E2, it is considered that an abnormally large temperature change around the battery 20 has occurred. Accordingly, the process proceeds to S500 and the MCU 34 controls the battery charger 40 to stop charging the battery 20 so as to complete the control during charging.

As described above during the control before the start of charging as illustrated in FIG. 7, the MCU 34 of the battery pack 10 can detect rapid change in environment temperatures with reference to a variation in environment temperatures detected by the second thermistor 32 before starting charging the battery 20 and can temporarily suspend starting charging the battery 20. Once the temperature variation becomes stable later, the MCU 34 then can start charging the battery 20.

According to the control during charging illustrated in FIG. 8, while charging the battery 20, either when the battery pack 10 is detached from the battery charger 40 or when the environment temperature around the battery 20 varies widely, charging the battery 20 can be stopped.

Further, according to the control during charging illustrated in FIG. 8, once charging the battery 20 is stopped due to the wide change in the environment temperature around the battery 20, charging the battery 20 can not be restarted automatically even when the environment temperature becomes stable later.

Figure 9:
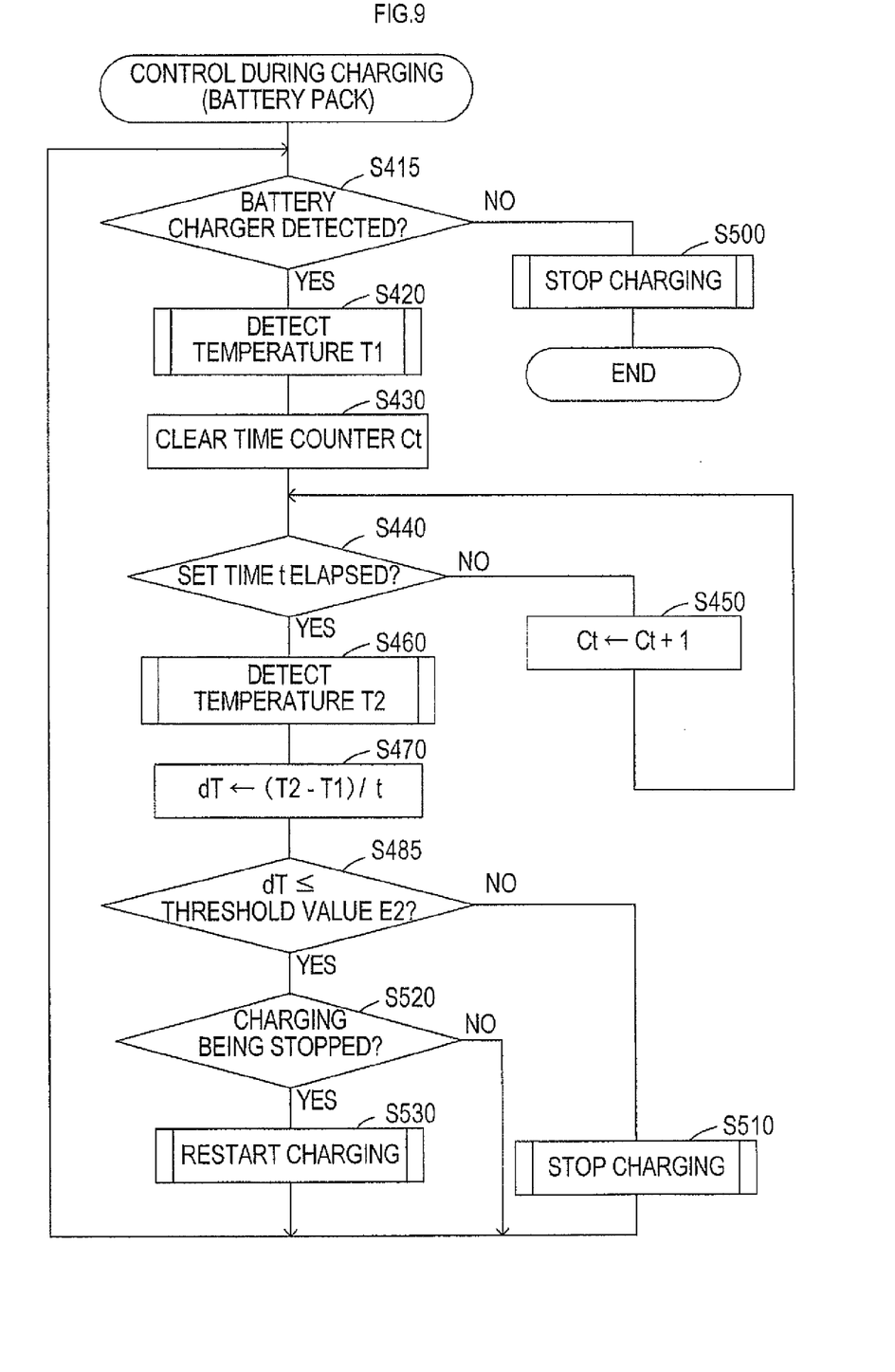
FIG. 9 is a flowchart illustrating a modified example of the control during charging illustrated in FIG. 8.

Accordingly, it is suggested to modify the control during charging illustrated in FIG. 8 to the one illustrated in FIG. 9 in order to automatically restart charging the battery 20 when the environment temperature becomes stable after stopping charging the battery 20 due to the wide change in the environment temperature while charging the battery 20.

Specifically, when the MCU 34 of the battery pack 10 determines in S485 of the flowchart illustrated in FIG. 9 that the absolute value of the temperature variation dT is greater than the threshold value E2, the process proceeds to S510 not to S500 to complete the control of charging the battery 20. In S510, the MCU 34 controls the battery charger 40 to temporarily discontinue charging the battery 20, and the process returns to S415.

When the MCU 34 of the battery pack 10 determines in S485 that the absolute value of the temperature variation dT is the threshold value E2 or less, the process proceeds to S520. In S520, the MCU 34 determines whether the battery charger 40 has currently been controlled to temporarily stop charging the battery 20 by the process at S510.

When the MCU 34 determines in S520 that the battery charger 40 is currently being controlled to temporarily stop charging the battery 20, the process proceeds to S530. In S530, the MCU 34 transmits the charging-restart command to the battery charger 40 and controls the battery charger 40 to restart charging the battery 20. The process then returns to S415.

When the MCU 34 determines in S520, to the contrary, that the battery charger 40 is not currently being controlled to stop charging the battery 20, the process returns to S415 directly.

Thus, according to the control during charging illustrated in FIG. 9, it is possible to automatically restart charging the battery 20 when the environment temperature becomes stable later even if charging the battery 20 is stopped due to change in the environment temperature around the battery 20 while charging the battery 20.

According to the embodiment, the abnormality of the thermistor 22 or 32, the low-temperature anomaly, or the abnormal temperature variation can be transmitted from the MCU 34 of the battery pack 10 to the MCU 56 of the battery charger 40. It is therefore possible to display the abnormality on the display unit 60 of the battery charger 40 and to notify the user of the abnormality.

However, such abnormality notification does not necessarily have to be performed at the side of the battery charger 40 and may be performed at the side of the battery pack 10. Alternatively, such abnormality notification may be performed both by the battery charger 40 and the battery pack 10.

In order to achieve the above, as denoted with a dotted line in FIG. 3, a display unit 70 may be provided in the battery pack 10, which is configured with a plurality of LEDs and serves for displaying abnormalities. In this case, an abnormality may be notified by use of the display unit 70 when the MCU 34 detects the abnormality of the thermistor 22 or 32 in S250, S270, when the MCU 34 detects the low-temperature anomaly in S240, and when the MCU 34 detects the abnormal temperature variation in S290. That is, in the modified example as described above, the display unit 70 provided in the battery pack 10 may serve as an example of the alarm of the present invention.

Further, in this case, as indicated by a dotted line in FIG. 2A, it is preferable to provide at the casing for the battery pack 10 a window 72 (window for display) for the user to confirm the display of the display unit 70 (lighted-up condition of the LEDs).

According to the embodiment, the second thermistor 32 that detects an environment temperature around the battery 20 is mounted on the surface of the control circuit substrate 30 at an opposite side to the surface of the battery 20. However, according to the present invention, the second thermistor 32 does not have to be always mounted on the surface of the control circuit substrate 30 as far as the second thermistor 32 is located somewhere away from the battery 20.

Further, the temperature detecting element that detects an environment temperature or a battery temperature does not have to be always a thermistor as described in the embodiment, and any elements that are able to detect temperatures may be applicable.

What is claimed is:

1. A battery pack comprising:
   a connecting portion that is connected to a battery charger;
   a battery that is allowed to be charged by the battery charger connected to the connecting portion;
   a battery temperature detecting element that detects a temperature of the battery;
   an environment temperature detecting element, which is separate from the battery temperature detecting element, that detects an environment temperature around the battery; and
   a control circuit that is adapted to periodically detect the environment temperature via the environment temperature detecting element and to control the battery charger to suspend starting of charging the battery or to temporarily discontinue charging the battery when a variation of the environment temperature detected exceeds a predetermined range, when the battery charger is connected to the connecting portion.

2. The battery pack according to claim 1, wherein the control circuit controls the battery charger to start or re-start charging the battery when the variation of the environment temperature falls within the predetermined range after controlling the battery charger to suspend starting of charging the battery or to temporarily discontinue charging the battery.

3. The battery pack according to claim 1, wherein the environment temperature detecting element is arranged on a substrate on which the control circuit is mounted or at a position that is farther away from the battery than the substrate is.

4. The battery pack according to claim 1, further comprising:
an alarm,
wherein, when the control circuit is controlling the battery charger to suspend starting of charging the battery or to temporarily discontinue charging the battery, the control circuit notifies a user of the control of the battery charger by the control circuit by so indicating on the alarm.

5. The battery pack according to claim 1, further comprising:
a battery temperature detecting element that is attached to the battery and detects a battery temperature; and
an alarm,
wherein the control circuit that is adapted to periodically detect the battery temperature via the battery temperature detecting element, to determine a presence of an abnormality of the environment temperature detecting element when a variation of the battery temperature detected exceeds a predetermined threshold value and the variation of the environment temperature detected falls within the predetermined range, and to notify a user of the presence of the abnormality of the environment temperature detecting element by so indicating on the alarm, when the battery charger is connected to the connecting portion.

6. The battery pack according to claim 5, wherein the control circuit determines a presence of an abnormality of the battery temperature detecting element when the variation of the environment temperature exceeds the predetermined range and the variation of the battery temperature detected via the battery temperature detecting element is equal to or smaller than the predetermined threshold value and notifies a user of the presence of the abnormality of the battery temperature detecting element via the alarm.

7. The battery pack according to claim 4, wherein the alarm is provided on the battery charger, and the control circuit controls the alarm to notify via the battery charger.

8. The battery pack according to claim 5, wherein the alarm is provided on the battery charger, and the control circuit controls the alarm to notify via the battery charger.

9. The battery charger that is connected to the battery pack according to claim 7 to charge the battery, the battery charger comprising:
a charging control unit that switches starting and stopping of charging the battery in accordance with a command from the battery pack,
wherein the charging control unit drives the alarm in accordance with transmitting of a condition of the battery pack from the battery pack and controls the alarm to notify a user of the condition of the battery pack.

10. The battery charger that is connected to the battery pack according to claim 8 to charge the battery, the battery charger comprising:
a charging control unit that switches starting and stopping of charging the battery in accordance with a command from the battery pack,
wherein the charging control unit drives the alarm in accordance with transmitting of a condition of the battery pack from and controls the alarm to notify the condition of the battery pack.

* * * * *